United States Patent [19]
Kohlschütter et al.

[11] 3,922,392
[45] Nov. 25, 1975

[54] PROCESS FOR COATING NONPOROUS MATERIAL WITH A POROUS SILICON DIOXIDE LAYER

[75] Inventors: Hans Wolfgang Kohlschütter; Klaus Unger; Jürgen Schick-Kalb, all of Darmstadt, Germany

[73] Assignee: Merck Patent Gesellschaft mit beschrankter Haftung, Darmstadt, Germany

[22] Filed: May 25, 1973

[21] Appl. No.: 364,117

[30] Foreign Application Priority Data
May 27, 1972   Germany............................ 2225973

[52] U.S. Cl.................. 427/215; 55/386; 210/31 C; 427/221; 427/341
[51] Int. Cl.²............................................ B05D 7/00
[58] Field of Search ...... 117/100 S, 62.1; 210/31 C; 55/386; 427/215, 221, 341

[56]        References Cited
         UNITED STATES PATENTS
2,730,841  1/1956  Searight............................ 117/100 S
2,885,366  5/1959  Iler................................... 117/100 B
3,128,196  4/1964  Pierpoint......................... 117/100 S
3,258,382  6/1966  Vincent.............................. 117/155
3,388,073  6/1968  Domba............................ 117/100 S
3,505,785  4/1970  Kirkland.......................... 117/100 S
3,722,181  3/1973  Kirkland et al. ................... 210/31 C
3,782,075  1/1974  Kirkland.............................. 55/386
3,790,475  2/1974  Eaton................................ 210/31 C
3,795,313  3/1974  Kirkland et al....................... 55/386

FOREIGN PATENTS OR APPLICATIONS
647,528   12/1950   Canada

OTHER PUBLICATIONS
"Chemistry and Technology of Silicones" by Walter Noll, 1968, pp. 648–651.
Analytical Chemistry, Vol. 37, No. 12, Nov. 1965, pp. 1458–1461.

Primary Examiner—William D. Martin
Assistant Examiner—Dennis C. Konopacki
Attorney, Agent, or Firm—Millen, Raptes & White

[57] ABSTRACT

Nonporous materials are coated with a porous silicon dioxide layer by coating the nonporous material with a polymeric alkoxysiloxane and then subjecting this coating to a hydrolytic polycondensation with an aqueous basic solution. The thus-obtained product is then dried.

9 Claims, No Drawings

PROCESS FOR COATING NONPOROUS MATERIAL WITH A POROUS SILICON DIOXIDE LAYER

BACKGROUND OF THE INVENTION

It is conventional to apply porous silicon dioxide as a thin layer to nonporous materials. Such products find a plurality of uses in chromatography. In the known coating processes, the materials to be coated are normally introduced into a solution of polysilicic acid. The spherical polysilicic acid particles, contained colloidally dissolved in the solution, are deposited on the surface of the material to be coated during the coagulation of the sol to a gel. These particles form a layer consisting of a more or less dense packing of adhering polysilicic acid particles. After the removal of the bound water by dehydration and drying, a thin, porous silicon dioxide layer is produced, the pore walls of which are formed by the surfaces of the aggregated polysilicic acid particles.

This conventional process has the disadvantage that polysilicic acid particles adhere to form aggregates not only on the material to be coated, but also within the solution, so that finally finely divided polysilicic acid gel is precipitated. This substance must be separated from the coated material is an additional working step. Furthermore, the conventional processes exhibit the disadvantage that the parameters of the pore structure of the porous silicon dioxide layer can be varied only within certain ranges. Moreover, such parameters are reproducible only with difficulties.

It is an object of the present invention to eliminate these disadvantages. It is possible, by the coating method of this invention, to produce porous silicon dioxide layers on a nonporous material, with the parameters of the porous layer being reproducible from batch to batch. Furthermore, the pore structure of the thus-obtained products can be adjusted in a controlled manner so that the specialized products maximally suitable for various applications, especially for chromatography, can be produced as desired.

SUMMARY OF THE INVENTION

According to this invention, nonporous materials are coated with a porous silicon dioxide layer by coating the nonporous material with a polymeric alkoxysiloxane, and then subjecting this coating to a hydrolytic polycondensation with an aqueous basis solution. The thus-obtained product is then dried for storage and packaging.

DETAILED DISCUSSION

Suitable starting nonporous materials are solid substances which are essentially inert materials which are insoluble and non-swellable in water and/or in the solvent utilized for dissolving the polyalkoxysiloxane. The term "nonporous material" means a material having a surface sufficiently free from pores such that when employed as the substrate in a chromatographic process, the materials microspheres through the separative or resolving zone will not pass into the body or interior of the core. Preferably, an inorganic material, preferably glass, is employed. If the material to be coated is in the form of small particles, the particle size of these particles preferably is about 1 to 500 $\mu$, with particle sizes of from 10 to 100 $\mu$ being useful for most purposes of application. For use in chromatography, it is furthermore advantageous if these nonporous materials have a narrow distribution of particle diameter. Here again, glass nicrospheres are preferred, especially those having a particle diameter of about 10–500 $\mu$, preferably about 30–40 $\mu$. Other materials in place of glass in finely divided form or in the form of substrates can likewise to employed, for example, synthetic resins, metals, metallic oxides, especially titanium dioxide or zirconium dioxide, any desired ceramic material, natural and synthetic silicates which can also be present in the form of scales, such as, for example, clay, kaolin, bentonite, and mica.

In the process of this invention, a coating of porous silicon dioxide is applied to these starting nonporous materials. In accordance with the process of this invention, this is accomplished in two steps, the first being coating the nonporous material with a polymeric alkoxysiloxane.

Alkoxysiloxanes are readily obtainable in a conventional manner by acidic hydrolysis of tetraalkoxysilanes, preferably tetraethoxysilane. Tetramethoxy-, tetrapropoxy- and tetrabutoxysilane can, for example, also be used. This partial hydrolysis is effected using a limited amount of water, e.g., about 1.1 to 1.6 moles of water per mole of tetraalkoxysilane. The average molecular weight of the thus-obtained tetraalkoxysiloxanes is about 1,000 to 5,000, preferably about 1,600 to 2,000. The viscosity of the polyalkoxysiloxanes can be controlled by the selected reaction conditions, especially by the water/tetraalkoxysilane molar ratio. Preferably, polyalkoxysiloxanes are employed in the process of this invention having a kinematic viscosity of between 100 and 500 centistokes. The polymeric alkoxysiloxanes contain already cross-linked siloxane groups in addition to alkoxy groups. Free hydroxyl groups are not present.

Further details regarding the production of such alkoxysiloxanes can be found, for example, in German Patent Application No. P 21 55 281 published Mar. 24, 1973.

The starting polymeric alkoxysiloxane is applied as a thin layer to the starting nonporous material. Advantageously, the coating of the nonporous material with polymeric alkoxysiloxanes is conducted in the presence of a readily volatile organic solvent. The desired layer thickness can be regulated by the proportion of polyalkoxysiloxane to nonporous material employed and partially also by the viscosity of the polyalkoxysiloxane. When coating small particles, the layer thickness of the thus-applied polyalkoxysiloxane is proportional to the amount of polyalkoxysiloxane employed. With a given quantity of polyalkoxysiloxane, the layer thickness is, in this case, furthermore proportional to the average particle diameter. The relationship of the layer thickness $d$ to be attained and the average diameter of the particles being coated can be calculated for any material in dependence on the particle shape, in accordance with the following formula:

$$d = \frac{m_p \cdot S \cdot d_p}{S_p \cdot C}$$

wherein
 $d$ = layer thickness in microns,
 $m_p$ = mass of polyalkoxysiloxane per g. of material to be coated,
 $S$ = density of the material to be coated, $S_p$ = density of the polyalkoxysiloxane (about 1.22 g./cm³),
$d_p$ = average particle diameter of the particles to be coated, and
$C$ = form (shape) factor of the particles to be coated.
Form factor C is derived from the formula:

$$C = \frac{s \cdot d_p}{v}$$

wherein
$v$ = volume of a particle and
$s$ = surface of a particle.
In the case of spherical particles, $C = 6$.

The starting nonporous particles are mixed with the selected proportion of liquid polyalkoxysiloxane so as to obtain a uniform coating. To coat the surfaces of the nonporous particles, they can, for example, be immersed in or sprayed with the polyalkoxysiloxane. Preferably, the polyalkoxysiloxane is employed as a solution in a readily removable solvent, for example, ether, acetone, dichloromethane or a low-boiling petroleum ether (up to 70° C.). In this way, the polyalkoxysiloxane can be distributed more uniformly on the nonporous particles to be coated. The nonporous material to be coated is introduced into this solvent solution of the polyalkoxysiloxane or it can be introduced into the solvent-free polyalkoxysiloxane. If small particles are coated, the suspension is thoroughly intermixed. Thereafter, the solvent is removed by evaporation, e.g., in air or by the use of a forced circulation evaporator, leaving a thin uniform coat of polyalkoxysiloxane on the nonporous material. Of course, it is also possible to add the liquid polyalkoxysiloxane to the solid particles.

The layer thickness can be varied within wide limits. Generally, it ranges between 0.1 and 100 μ and is dependent, particularly when coating small particles, on the particle diameter. In the case of spherical particles, the layer thickness generally will be about 1/10 to 1/500 of the diameter of the solid bodies. In case of glass spheres having a diameter of 30–40 μ, for example, a layer thickness of about 0.1 to 1.0 μ is preferred. With a polyalkoxysiloxane having a viscosity of between 100 and 500 centistokes, about 2–10% by weight of polyalkoxysiloxane (based on the weight of the glass spheres) is required for this purpose.

When coating flat solid bodies, somewhat greater layer thicknesses are usually obtained, especially when the polymeric alkoxysiloxane is applied by immersing the solid bodies therein. The layer thickness is dependent, in this case, essentially on the viscosity of the polyalkoxysiloxane or solution thereof employed.

The thus-coated materials are subjected to a hydrolytic polycondensation to render the coating thereon porous. The term "hydrolytic polycondensation" means that a hydrolysis and a condensation take place simultaneously to produce a silica hydrogel, i.e., $SiO_2$ in polymeric form. This reaction is accomplished by an excess of water in the presence of hydroxyl ions. By chaing the concentration of the hydroxyl ions in this hydrolytic polycondensation, the parameters of the pore structure of the porous silicon dioxide layers, for example, the average pore diameter, can be varied over wide limits. By increasing the hydroxyl ion concentration, both the average pore diameter and the specific pore volume are increased, with the specific surface area being reduced accordingly. In order to obtain silicon dioxide layers having average pore diameters of 30–800 A., aqueous solutions having a hydroxyl ion concentration of $1 \times 10^{-3}$ to 1.5 moles per mole of $SiO_2$ in the polyalkoxysiloxane are employed. Suitable substances capable of yielding hydroxyl ions are bases, preferably alkaline hydroxides. Ammonium hydroxide and sodium hydroxide are preferred, in this connection, because they are readily accessible technically. However, other basic compounds yielding hydroxyl ions, for example, alkaline salts of weak acids e.g., sodium acetate, and basic organic compounds, such as, for example, primary, secondary and tertiary amines, e.g., methyldimethyl-, or trimethylamine, or also urotropine (hexamethylenetetramine) can also be used.

Where specific pore structures are desired, ammonium hydroxide is preferably employed, usually in a concentration range of 0.01–2 moles per mole of $SiO_2$ in the polyalkoxysiloxane. At these concentrations, the porosity of the thus obtained silicon dioxide layers is particularly advantageous and values of between 60 and 70% can readily be attained. The porosity is defined as the specific pore volume, multiplied with 100, and divided by the total volume (pore volume + volume of the carrier material).

The preferred concentration ranges when sodium hydroxide is used are 0.001 to 0.1 mole of NaOH per mole of $SiO_2$ in the polyalkoxysiloxane. Insofar as it is not desired that the parameters of the pore structure be controlled in a defined manner, it is also possible to utilize any desired other concentration of hydroxyl ions.

The hydrolysis of the polyalkoxysiloxane layer is conducted in a conventional manner. It is advantageous when hydrolyzing coated small particles to combine the coated, nonporous particles with water and a water-miscible solvent, e.g., methanol, ethanol or dioxane. Preferably, an alcohol is used which corresponds to the alkoxy group of the polyalkoxysiloxane employed. The thus-produced suspension, containing an excess of water, is then vigorously agitated before the alkali is added. The heterogeneous mixture is dispersed under intensive agitation and subsequently allowed to stand, preferably for a substantial length of time. The reaction mixture can be occasionally shaken during this step. The reaction temperature can be varied, preferably in the range of about 20°–80° C. When increasing the reaction temperatures, all other conditions being the same, an increase in the average pore diameter is achieved.

By wetting the nonporous material coated with the polymeric alkoxysiloxane, with a solvent/water mixture, any agglomerated particles of the coated material are separated. At the same time, the polyalkoxysiloxane layer swells. The hydroxyl ions effect a rapid hydrolytic polycondensation of the still unreacted alkoxy groups in the polyalkoxysiloxane layer. The reaction begins externally at the applied coating and then progresses into the interior of the layer. As a final product, a polysilicic acid gel is obtained which remains after washing and drying, as a porous layer.

The hydrolysis of coated, flat or sheet-like solid elements is suitably conducted under gentle conditions, in order to avoid a flaking off of the layer. It is advantageous to first treat the coated areas for a short time with ammonia vapors and then subject the thus-pretreated layers to a residual hydrolysis in warm water, e.g., about 50° to 90° C. Suitably, the flat elements or flakes are suspended in a reaction vessel during this process, in order to avoid damage to the coating layer.

The thus-obtained porous products are optionally then separated, washed and dried. The washing step is preferably carried out first with the water/alcohol mixture employed for the hydrolysis and then with various organic solvents, e.g., ethanol and ether. The conditions under which the washing of the freshly produced preparations is conducted exert an additonal influence on the pore structure of the porous silicon dioxides. For example, by decocting the preparation prior to the washing step with distilled water, the specific surface area of the preparations is reduced, and the average pore diameter increases correspondingly.

After the products have been washed free of electrolyte, they are dried, for example at temperatures of about 60°–140° C. for approximately 12 hours or at lower temperature under reduced pressure. In case of coated synthetic resin films, the lower portion of this temperature range is normally employed.

The porous material obtained in this way is usable for a great variety of purposes, including especially chromatography. It is thus possible for the first time to provide products which are standardized with respect to the average pore diameter and the layer thickness. Both values are reproducible and can be adjusted by choice. The small particle porous products can be used in rapid fluid chromatography (column chromatography), as catalysts, as supports for catalysts, or a auxiliary filtering agents. The coated flat porous surface materials can be used in layer chromatography in the conventional manner.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

In a 500 ml. round flask, 250 g. of glass spheres having a diameter of about 30–40 microns and previously dried for two hours at about 140° C., are mixed with 20 g. of polyethoxysiloxane (average molecular weight 1,600, kinematic viscosity 150 centistokes) and about 50 ml. of ether, so that a uniform, flowing composition is produced. The ether serves to enhance the distribution of the polyethoxysiloxane onto the surface of the glass spheres. The ether is subsequently removed with the use of a forced circulation evaporator. 150 ml. of an ethanol/water mixture (volume ratio 1:2) is added to the glass spheres coated with polyethoxysiloxane, and the mixture is well agitated [shaken] for several minutes. Thereafter, the suspension is mixed with 5 ml. of 25% strength ammonium hydroxide (OH-ion concentration 0.065 mole/mole $SiO_2$ in the polyethoxysiloxane) and intensively shaken for another 5 minutes. The suspension is then allowed to stand for one hour with occasional shaking. The coated glass spheres are filtered and washed twice with, respectively, 150 ml. of an ethanol/water mixture (volume ratio 1:2). The washed spheres are then made into a slurry three times in 100 ml. portions of ether, and decanted off in each case. After filtering, the glass spheres are once again washed with respectively 2 × 100 ml. of ether.

The product is first air-dried and then forced through a screen (mesh width 63 microns) in order to separate any agglomerates present therein. Thereafter, the glass spheres are dried for about 12 hours at 140° C.

After drying, an aftertreatment can be conducted. During this procedure, the glass spheres are first scalded for a few minutes with 1.5 L. of distilled water. Then, the spherical beads are made into a slurry three times in 1 liter portions of distilled water and decanted, then filtered off and once againg washed twice with ethanol and ether, and finally dried for 12 hours at 140° C.

The porous $SiO_2$ layer of the thus-obtained glass beads has a specific surface area $S_{BET}$ of 15.0 m²/g.

EXAMPLE 2

Analogously to Example 1, glass spheres having a diameter of about 30–40 microns are coated.

250 g. portions of these spherical glass beads are used. After removing the ether by evaporation, a 150 ml. portion of the ethanol/water mixture (1:2) is added thereto.

The results of various conditions used in the experiments are set forth in the following Table I.

TABLE I

| % by Weight of Polyalkoxysiloxane on the Spherical Glass Beads | Amount of NH₄OH Added, in ml. (25% Strength) | Mole of OH-Ions per Mole of SiO₂ in Polyalkoxysiloxane | Scalding Time in 1.5 l. of Dist. H₂O in Minutes | Specific Surface Area $S_{BET}$ m²/g. |
|---|---|---|---|---|
| 8 | 5 | 0.065 | 0 | 21.0 |
| 8 | 5 | 0.065 | 5 | 18.0 |
| 8 | 5 | 0.065 | 10 | 15.0 |
| 8 | 5 | 0.065 | 15 | 9.0 |
| 5 | 1 | 0.013 | 10 | 11.4 |
| 5 | 5 | 0.065 | 10 | 11.0 |
| 5 | 10 | 0.130 | 10 | 10.5 |
| 2.5 | 5 | 0.065 | 0 | 5.5 |
| 2.5 | 5 | 0.065 | 10 | 2.2 |

EXAMPLE 3

Analogously to Example 2, 250 g. of spherical glass beads (diameter 30–40 μ) are subjected to the coating step. In place of ammonium hydroxide, 20 ml. of trimethylamine (45% aqueous solution) is used as the catalyst yielding hydroxyl ions.

At a scalding time of 10 minutes in 1.5 liters of distilled water, glass spheres are obtained with a porous $SiO_2$ coating having a specific surface $S_{BET}$ of 3.7 m²/g. Without the scalding step, the glass spheres have a specific surface $S_{BET}$ of 6.9 m²/g.

EXAMPLE 4

Analogously to Example 1, 250 g. of glass spheres with a particle diameter of 30–40 μ are subjected to the coating step, the catalyst employed being 5 ml. of concentration NH₄OH. The thus-obtained product is scalded for 10 minutes in 1.5 liters of distilled water and, after filtering, washed once more with ether. The product is dried for about 10 hours at 140° C. The firmly adhering, porous $SiO_2$ layer has the following characteristics:

Specific surface area $S_{BET}$: 15.0 m²/g.
Specific pore volume $V_p$: 0.04 ml./g.
Average pore diameter $d_p$: 54 A.

The pore size distribution curve of the preparation, determined from the desorption isotherm with nitrogen, is very narrow and has a maximum at a pore diameter of about 54 A.

EXAMPLE 5

50 g. of dried aluminum grit (average grain diameter about 300 mircons) is mixed with a solution of 2 g. of polyethoxysiloxane (average molecular weight 1,600, kinematic viscosity 150 centistokes) in 20 ml. of ether. The ether is removed with a forced circulation evaporator. 50 ml. of an ethanol/water mixture (volume ratio 1:2) is added to the aluminum grit coated with polyethoxysiloxane, and the mixture is agitated for 2 minutes. The suspension is then combined with 5 ml. of concentrated ammonia (25%) and again thoroughly agitated for 10 minutes. The coated aluminum grit is washed with the above-mentioned ethanol/water mixture, with pure ethanol, and finally with ether, and thereafter dried at 120° C.

The porous coating on the aluminum grit can clearly be detected by microscope by adding thereto a solution of methyl red. The coated preparation has a specific surface of 10.0 m²/g.

EXAMPLE 6

A glass plate having the dimensions of 10 × 20 cm., thickness 1 mm., is vertically immersed into a solution containing 40 g. of polyethoxysiloxane (molecule weight about 1,650, viscosity 221 centistokes) in 100 ml. of ether. The plate is removed from the solution and allowed to dry for about 1 minute in air until the solvent has been eliminated by evaporation. Then, the coated plate is introduced for about 20 seconds into a sealed vessel with a saturated ammonia atmosphere (25% $NH_4OH$). Thereafter, the plate is suspended for about 15 minutes in water having a temperature of 80° C. and then dried at about 80° C. in a drying chamber. Due to the gentle hydrolysis, a smooth, coherent $SiO_2$ layer is obtained having a coating thickness of about 40 $\mu$, and a porosity of 70 %.

EXAMPLE 7

A 5 × 10 cm. sheet of aluminum foil having a thickness of about 100 $\mu$ is immersed, analogously to Example 6, into a solution containing 100 ml. of acetone in place of the ether as the solvent for the polyethoxysiloxane. After the hydrolysis, an $SiO_2$ layer having a thickness of about 20 $\mu$ is produced on both sides. The porosity of the layer is 70 %.

When using highly viscous polyalkoxysiloxanes and/or omitting the solvent, substantially thicker layers, e.g. up to 100 $\mu$, can also be produced.

EXAMPLE 8

Analogously to Example 6, a 5 × 10 cm. sheet of synthetic resin film having a thickness of 190 $\mu$ is subjected to the coating step. A solution of 40 g. of polyethoxysiloxane in 120 ml. of ether is utilized. A porous $SiO_2$ layer of a thickness of about 10 $\mu$ is obtained on both sides of the film.

The preceding examples can be repeated with similar success by substituting the generically or specifically described reactants and/ or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for coating a nonporous material with a porous silicon dioxide layer suitable for use in chromatography, which comprises:
    a. coating said nonporous material with a preformed polymeric tetraalkoxysiloxane consisting essentially of alkoxy groups and cross-linked siloxane groups, havng a molecular weight of about 1,000–5,000 and a kinematic viscosity of 100–500 centistokes to form a thin, uniform coating thereon; and
    b. subjecting the resultant coated material to hydrolytic polycondensation by treatment with an aqueous solution having a hydroxyl ion concentration of $1 \times 10^{-3}$ to 1.5 moles per mole of $SiO_2$ in the polyalkoxysiloxane employed, said aqueous solution consisting essentially of water and a basic compound, to produce a layer of porous, polymeric silicon dioxide hydrogel thereon having a thickness of 0.1 –100$\mu$ and an average pore diameter of 30–800 A.

2. A process according to claim 1, wherein the coating of the nonporous material is conducted in the presence of a readily volatile organic solvent.

3. A process according to claim 1, wherein the basic compound is ammonium hydroxide.

4. A process according to claim 1, wherein the nonporous material is particulate.

5. A process according to claim 3, wherein the nonporous material is glass microspheres.

6. A process according to claim 5, wherein the glass spheres have an average diameter of 30–40 microns.

7. A process according to claim 1, wherein the pores of the thus-produced porous coating are increased by contacting the porous coated material with hot water after the hydrolytic polycondensation.

8. A process according to claim 7, wherein the nonporous material is glass microspheres.

9. A process according to claim 8, wherein the basic compound is ammonium hydroxide.

* * * * *